US012725024B2

(12) United States Patent
Lee et al.

(10) Patent No.: US 12,725,024 B2
(45) Date of Patent: Sep. 1, 2026

(54) ACCELERATOR SYSTEM FOR TRAINING DEEP NEURAL NETWORK MODEL USING NAND FLASH MEMORY AND OPERATING METHOD THEREOF

(71) Applicant: Seoul National University R&DB Foundation, Seoul (KR)

(72) Inventors: Jae W. Lee, Seoul (KR); Yunho Jin, Seoul (KR); Jong Hyun Bae, Seoul (KR); Gin A Sohn, Seoul (KR); Tae Jun Ham, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 913 days.

(21) Appl. No.: 18/089,141

(22) Filed: Dec. 27, 2022

(65) Prior Publication Data

US 2023/0259747 A1 Aug. 17, 2023

(30) Foreign Application Priority Data

Feb. 17, 2022 (KR) ........................ 10-2022-0020937

(51) Int. Cl.
*G06N 3/063* (2023.01)
*G06F 9/48* (2006.01)
(Continued)

(52) U.S. Cl.
CPC ........... *G06N 3/063* (2013.01); *G06F 9/4881* (2013.01); *G06F 9/5016* (2013.01); *G06N 3/084* (2013.01); *G06F 2209/485* (2013.01)

(58) Field of Classification Search
CPC ........ G06N 3/063; G06N 3/084; G06N 3/048; G06N 3/08; G06N 3/065; G06N 3/045;
(Continued)

(56) References Cited

U.S. PATENT DOCUMENTS

2020/0034697 A1 * 1/2020 Choi ..................... G11C 16/10
2021/0042260 A1 * 2/2021 Reinhardt ............. G06F 9/3881
(Continued)

FOREIGN PATENT DOCUMENTS

KR 10-2012-0034532 A 4/2012
KR 10-2020-0062323 A 6/2020
(Continued)

OTHER PUBLICATIONS

Lee, Sung-Tae, et al. "Operation scheme of multi-layer neural networks using NAND flash memory as high-density synaptic devices." IEEE Journal of the Electron Devices Society 7 (2019): 1085-1093 (Year: 2019).*
(Continued)

*Primary Examiner* — Shahid K Khan
(74) *Attorney, Agent, or Firm* — Cesari and McKenna, LLP

(57) ABSTRACT

A DNN accelerator system includes a plurality of accelerator nodes each including a plurality of NAND flash memories, a flash memory system (FMS) controller for controlling the plurality of NAND flash memories, and a tensor buffer, and a processor configured to generate an operation sequence of the plurality of accelerator nodes, in which a DNN model is trained in a data parallel manner using the plurality of accelerator nodes.

20 Claims, 5 Drawing Sheets

(51) Int. Cl.
*G06F 9/50* (2006.01)
*G06N 3/084* (2023.01)

(58) Field of Classification Search
CPC ................. G06F 9/4881; G06F 9/5016; G06F 2209/485; G06F 7/57; G06F 12/0653
See application file for complete search history.

(56) References Cited

U.S. PATENT DOCUMENTS

| | | | | |
|---|---|---|---|---|
| 2021/0248416 | A1* | 8/2021 | Navon | G06N 3/084 |
| 2021/0304010 | A1* | 9/2021 | Sengupta | G06N 3/0464 |

FOREIGN PATENT DOCUMENTS

| | | | |
|---|---|---|---|
| KR | 10-2020-0078762 | A | 7/2020 |
| KR | 10-2021-0022455 | A | 3/2021 |
| KR | 10-2021-0082345 | A | 7/2021 |

OTHER PUBLICATIONS

Hasan, Md Mehedi, and Biswajit Ray. "Reliability of NAND flash memory as a weight storage device of artificial neural network." IEEE Transactions on Device and Materials Reliability 20.3 (2020): 596-603 (Year: 2020).*

Khan, Osama, Gwanjong Park, and Euiseong Seo. "Dacapo: An on-device learning scheme for memory-constrained embedded systems." ACM Transactions on Embedded Computing Systems 22.5s (2023): 1-23 (Year: 2023).*

Lee, Sung-Tae, et al. "NAND flash based novel synaptic architecture for highly robust and high-density quantized neural networks with binary neuron activation of (1, 0)." IEEE Access 8 (2020): 114330-114339 (Year: 2020).*

Zhu, Hanging, et al. "ELight: Enabling efficient photonic in-memory neurocomputing with life enhancement." 2022 27th Asia and South Pacific Design Automation Conference (ASP-DAC). IEEE, 2022 (Year: 2022).*

Office Action for Korean Patent Application No. 10-2022-0020937 mailed from the Korean Intellectual Property Office on Feb. 21, 2024, 22 pages.

S. Kim et al., "Behemoth: A Flash-centric Training Accelerator for Extreme-Scale DNNs," Proceedings of the 19th USENIX Conference on File and Storage Technologies, Feb. 23-25, 2021, ISBN: 978-1-939133-20-5, 16 pages.

* cited by examiner

PROCESSOR 110

120

FMS CONTROLLER 121

TENSOR BUFFER 122

NAND 123

140

| #: Stream name (Act. Node / Weight Node) | PERSISTENCE | RETENTION | Access permission | |
|---|---|---|---|---|
| | | | PROCESSOR (110) | ACCELERATOR NODE (120) |
| 1: NV-Stream (Training inputs / – ) | Non-volatile | Years | Append-only seq. write | Read only |
| 2: V-Stream (Activations / Interm. weights) | Volatile | Minutes | N/A | Read & Append-only seq. write |
| 3: NV-Stream (– / Trained weights) | Non-volatile | Years | Read only | Read & Append-only seq. write |

FIG. 6

(a) Write command pipeline: Max. 56GB/s

Cmd parsing (200 CLKs)
NVMe/PCIe Interface Ctrl.
Buffer allocation (120 CLKs / LP)
Buffer Ctrl.x4
DMA from TSB (34 CLKs / LP)
DMA Ctrl.
Cmd. completion (200 CLKs)
NVMe/PCIe Interface Ctrl.
SRAM Buffer
Flash Buffer Ctrl.x4
Buffer search & invalidation (120 CLKs / LP)
FTL Ctrl.x4
NAND Page allocation (120 CLKs / LP)
NAND Ctrl. x 64 Channels
NAND program issue and completion (2048 CLKs / PP)
Ctrl (Controller)
Cmd (Command)
CLK (Clock): 2.12ns (450Mhz)
LP (Logical Page): 4KB
PP (Physical Page: 4KB
TSB (Tensor Buffer)
H/W FIFO
Data path (b) NAND program pipeline: Max. 64GB/s

FIG. 7

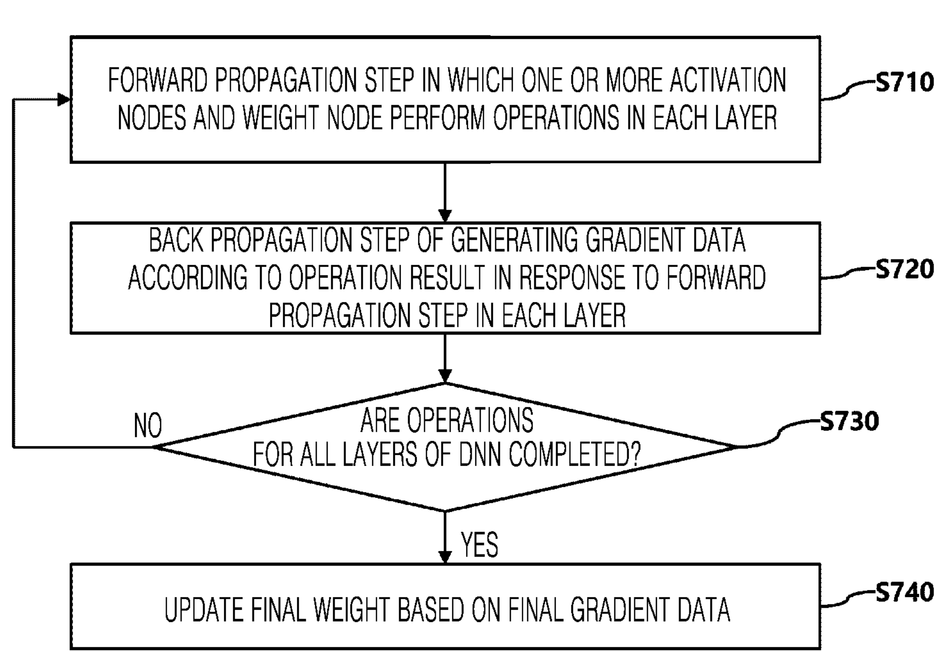

ACCELERATOR SYSTEM FOR TRAINING DEEP NEURAL NETWORK MODEL USING NAND FLASH MEMORY AND OPERATING METHOD THEREOF

RELATED APPLICATIONS

This application claims priority to Korean Patent Application No. 10-2022-0020937, filed on Feb. 17, 2022, the entirety of which is incorporated herein by reference.

BACKGROUND OF THE INVENTION

Field of the Invention

The present invention relates to an accelerator system for training a deep neural network (DNN) model, and more particularly to an accelerator system for training a large-scale DNN model using a high-capacity NAND flash memory and an operating method thereof.

Description of the Related Art

The size of DNN models has increased by more than a thousand times in the past two years, and such explosive expansion of the size of DNN models is accelerating the need for larger memory capacity, which is especially true for natural language processing (NLP) models that dominantly apply computer vision and AI. For example, a recent large-scale language model GPT-3 of OpenAI has more than 175 billion parameters. In addition, most of these models include fully connected (FC) layers to have significantly large dimensions, and thus have relatively high computational complexity. In that sense, an extremely large language model hardly has efficiency in an existing high bandwidth memory (HBM) DRAM-based memory system since the existing HBM dynamic random access memory (DRAM)-based memory system lacks the capacity to process a DNN model while providing a significantly high bandwidth.

SUMMARY OF THE INVENTION

Therefore, the present invention has been made in view of the above problems, and it is an object of the present invention to provide an accelerator system for training a DNN model of a NAND flash-based memory system instead of an HBM DRAM-based memory system.

It is another object of the present invention to provide a hardware structure of an accelerator system for training a DNN model based on a NAND flash memory.

Other aspects, features, and advantages other than those described above will become apparent from the following drawings, claims, and detailed description of the invention.

In accordance with an aspect of the present invention, the above and other objects can be accomplished by the provision of a deep neural network (DNN) accelerator system including a plurality of accelerator nodes each including a plurality of NAND flash memories, a flash memory system (FMS) controller for controlling the plurality of NAND flash memories, and a tensor buffer, and a processor configured to generate an operation sequence of the plurality of accelerator nodes, in which a DNN model is trained in a data parallel manner using the plurality of accelerator nodes.

In accordance with another aspect of the present invention, there is provided a method of training a DNN model including a forward propagation step in which, while iterative training is performed for one or more layers of the DNN model, one or more activation nodes and a weight node perform an operation in each of the one or more layers, a back propagation step in which the one or more activation nodes and the weight node generate gradient data according to the operation in response to each forward propagation step, and a step of updating, by the weight node, a final weight based on final gradient data in response to completion of operations of all the layers.

In accordance with a further aspect of the present invention, there is provided a computer-readable non-transitory recording medium storing a computer program including at least one instruction configured to execute, by a processor, the method of training the DNN model.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a block diagram of a DNN accelerator system according to an embodiment;

FIG. 6 illustrates a hardware pipeline step for a write path of an FMS and timing of each pipeline step according to an embodiment; and FIG. 7 is a flowchart of a method of training a DNN model according to an embodiment.

DETAILED DESCRIPTION OF THE INVENTION

Figure 2:
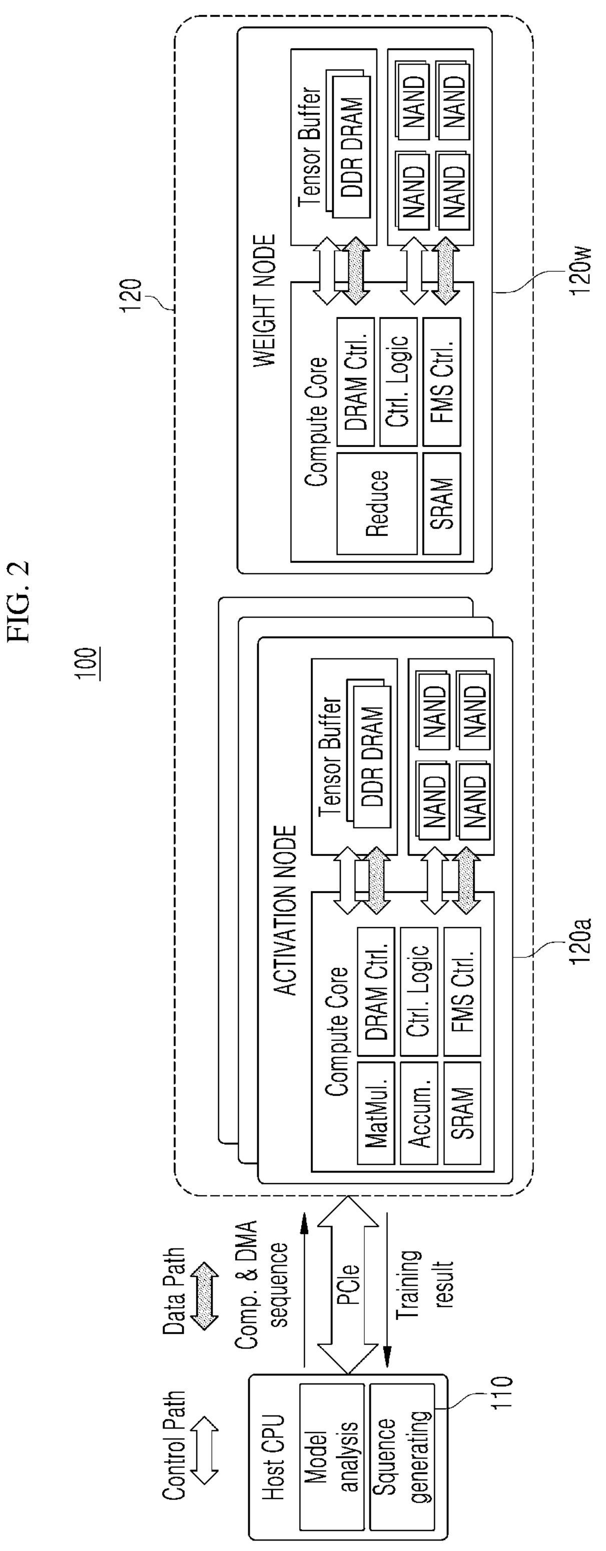
FIG. 2 is a detailed block diagram of the DNN accelerator system according to an embodiment.

Hereinafter, embodiments will be described in detail with reference to the accompanying drawings. However, the scope of rights is not limited or restricted by these embodiments. Like reference numerals in each figure indicate like elements.

The terms used in the description below have been selected as general and universal in the related technical field. However, there may be other terms depending on the development and/or change of technology, preference of conventional technicians, etc. Therefore, the terms used in the description below should not be construed as limiting the technical idea, and should be understood as exemplary terms for describing the embodiments.

Further, in specific cases, there are terms arbitrarily selected by the applicant, and in this case, the meaning will be described in detail in the corresponding description. Therefore, the terms used in the description below should be understood based on the meaning of the term and the content throughout the specification, not the simple name of the term.

Figure 1:
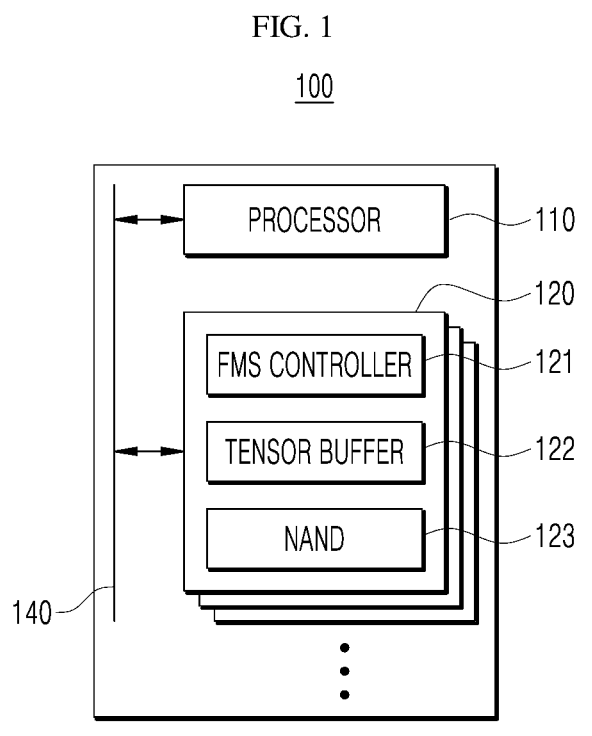

FIG. 1 is a block diagram of a DNN accelerator system according to an embodiment.

A DNN accelerator system 100 according to an embodiment includes a processor 110 that analyzes a DNN model and generates an instruction sequence for DNN training, a plurality of accelerator nodes 120 that trains the DNN model according to the instruction sequence, and a bus 140 that is a logical/physical path connecting the processor 110 and the accelerator nodes 120 to each other. The DNN accelerator system 100 may train a DNN model exceeding a memory size of an existing HBM-based DNN accelerator in one or more NAND flash-based accelerator nodes 120 in a data parallel manner without model division.

The processor 110 is a type of central processing unit (CPU), and for example, may refer to a data processing device embedded in hardware having a physically structured circuit to perform a function expressed as code or an instruction included in a program. As an example of the data processing device embedded in the hardware as described above, it is possible to include processing devices such as a microprocessor, a CPU, a processor core, a multiprocessor, an application-specific integrated circuit (ASIC), and a field programmable gate array (FPGA). However, the data processing device is not limited thereto. The processor 110 may include one or more processors. The processor 110 may include at least one core.

Each of the accelerator nodes 120 includes a plurality of NAND flash memories 123 as main memories, and may include an FMS controller 121 that controls the NAND flash memories 123 and a tensor buffer 122 including a double data rate (DDR) DRAM. In an embodiment, the DNN accelerator system 100 may include a plurality of activation nodes each including an FMS and one weight node as the accelerator nodes 120.

The bus 140 is a logical/physical path connecting the processor 110 and the accelerator nodes 120 to each other. The processor 110 may transmit/receive data to/from the accelerator nodes 120 through the bus 130. In an embodiment, the bus 140 may be PCIe.

FIG. 2 is a detailed block diagram of the DNN accelerator system 100 according to an embodiment. The DNN accelerator system 100 may start DNN training by the processor 110 analyzing a DNN model, generating a calculation instruction and a direct memory access (DMA) sequence, and transmitting the generated calculation instruction and DMA sequence to the accelerator nodes 120 via a bus PCIe. When DNN training is completed in the accelerator nodes 120, the processor 110 may receive a training result through the bus PCIe. The accelerator nodes 120 may include one or more activation nodes 120*a* and one weight node 120*w*. The activation node 120*a* may serve to perform calculation of a DNN training process, and the weight node 120*w* may serve as a type of parameter server to provide weights to a plurality of activation nodes 120*a* and update/store weights according to an operation result until training is completed. The accelerator nodes 120, that is, the activation node 120*a* and the weight node 120*w* may include a compute core, a tensor buffer, and a plurality of NAND flash memories (referred to hereinafter as FMS).

In existing DNN model training, a solid state drive (SSD) is mainly used, and the SSD has a problem in that a bandwidth is significantly low when access patterns are not sequential, and even when the access patterns are sequential, a sustained write bandwidth is occasionally lower than a peak bandwidth due to SSD garbage collection (GC) operations. In addition, since the SSD can only hold a limited number of writes, there is a problem in that a lifespan of the SSD is greatly reduced when the SSD is used for DNN model training. In the SSD, random writes tend to increase a write amplification factor (WAF), which is a huge problem when the access patterns are not sequential. In order to solve the problem that occurs when using the SSD as described above, the DNN accelerator system 100 according to the embodiments of the present disclosure utilizes a NAND flash-based memory system (Flash Memory System). The FMS of the DNN accelerator system 100 is designed to reflect data characteristics of DNN training, and thus has an effect of improving bandwidth and durability.

The processor 110 may analyze a DNN model, generate an instruction sequence, transmit the generated instruction sequence to the accelerator nodes 120 to train the DNN model, and receive a training result from the accelerator nodes 120. Most of the recent DNN frameworks use a Python model. The processor 110 performs a pre-processing process for analyzing the DNN model, extracting layer information, and generating a series of instructions executable by the accelerator nodes 120 using the Python model. The instruction sequence may be delivered to the accelerator nodes 120 and executed.

In various embodiments, the processor 110 may define a DNN model to be trained using a machine learning library of either open or closed source, such as PyTorch and TensorFlow, for DNN model analysis. In a model analysis step, the processor 110 may collect information about an order of each layer, an argument used for an operation of a layer, and an input/output tensor to be used. This step may operate similarly to a process of generating static computational graphs in Caffe and TensorFlow.

The processor 110 generates two types of instruction sequences, an operation instruction sequence and a DMA instruction sequence, based on model data collected during a DNN model analysis process. The DMA instruction sequence controls data transfer between a tensor buffer and a NAND flash device. A DMA instruction includes fields for a transfer direction (read/write), a logical block address (LBA) of the NAND device, and a tensor buffer address. The operation instruction sequence lists operation instructions to be performed by the compute core. An operation instruction includes fields for a layer type (for example, fully connected and convolution) and an address of a tensor buffer in which input and output tensors of a layer are to be stored. Both the two types of instruction sequences are transmitted to the accelerator nodes 120 and stored in a non-volatile stream area.

The accelerator system 100 according to an embodiment includes a single weight node 120*w* and a plurality of activation nodes 120*a* in order to maximize a bandwidth between the tensor buffer and the NAND flash. Each of the accelerator nodes 120 includes a compute core, a tensor buffer, and a NAND flash, and stores weights of a target training model in the NAND flash. The activation node 120*a* generates an activation tensor during forward propagation and stores the activation tensor locally in the NAND flash for reuse during backward propagation.

The compute core is not bound to a specific structure of the DNN accelerator system 100. However, the DNN accelerator system 100 specializes in DNN processing, and may performed matrix multiplication and addition operation (MAC (multiply-accumulate) operation). The accelerator system 100 is configured as a two-dimensional program element (PE) array so that each PE can perform a single MAC operation every clock cycle. The accelerator system 100 assumes a fixed-weight data flow structure, where weights are loaded directly from the tensor buffer and held in a local register inside the PE. At each cycle, a new input is provided to the PE from an SRAM buffer of the compute core. This input is multiplied by a corresponding weight of PE, and a result is accumulated. When computation is complete, an output value is transmitted to the SRAM buffer and eventually transmitted to the tensor buffer.

Control logic coordinates data transfer among the SRAM buffer, the tensor buffer, and the FMS, and specifies an order of operation instructions. Specifically, control logic decodes an instruction provided by the processor 110 and verifies whether the instruction can be reserved (that is, all dependencies are met). Control logic transmits this instruction to the compute core in the case of a calculation instruction and to a DRAM controller or an FMS controller in the case of a DMA instruction, and initiates requested DMA. The control logic simply arranges instructions in order.

The tensor buffer is a DDR DRAM area that serves as a staging area between the compute core and the FMS. The tensor buffer smooths traffic between the FMS and the compute core. Thus, the tensor buffer only stores temporary data and does not require persistence.

The FMS is storage of the accelerator system 100 according to various embodiments of the present disclosure that replaces an HBM of an existing DNN accelerator (for example, Tensor Processing Unit (TPU)). As in the SSD, this element includes a set of NAND chips. Unlike an existing SSD, there is a hardware-based FMS controller that replaces a flash translation layer (FTL) executed on a general-purpose core. The FMS controller interacts with control logic and transmits data to the tensor buffer.

The accelerator nodes 120 according to embodiments have the following characteristics.

First, the accelerator nodes 120 may include a logically or physically separated storage space for classifying data necessary for DNN training according to characteristics thereof and storing the data. Second, the accelerator nodes 120 may use sequential access (read/write) to each space divided according to characteristics of DNN training data. According to embodiments, it is possible to minimize functions of NAND flash storage device firmware (for example, wear-leveling, GC, etc.), and implement a concise data path of the FMS obtained in this way in hardware to accelerate performance of NAND flash memory-based storage. Third, the accelerator nodes 120 may relax retention characteristics of the NAND flash memory in consideration of a short lifespan of data generated during DNN training, and increase a frequency of program/erase (P/E) to increase a lifespan of the NAND flash memory-based storage.

Figure 3A:
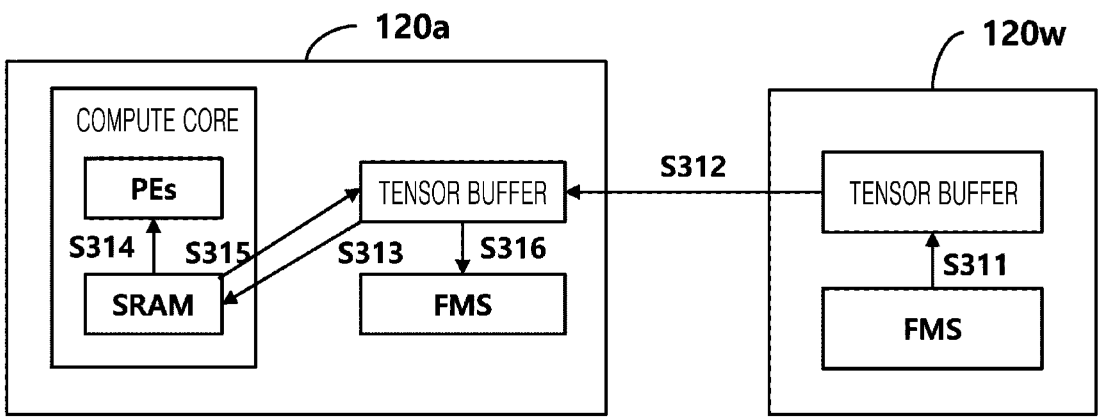
FIGS. 3A to 3C illustrate a data flow according to a DNN training process according to an embodiment.
Figure 3B:
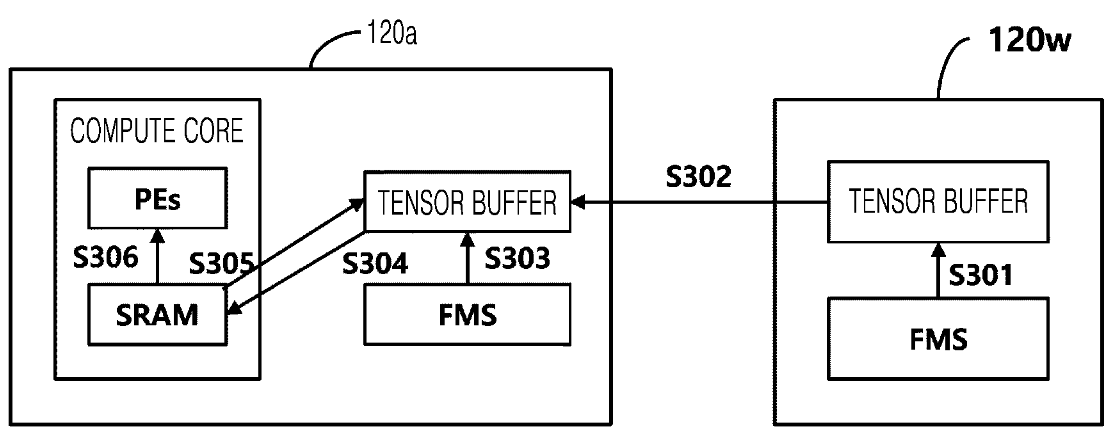
Figure 3C:
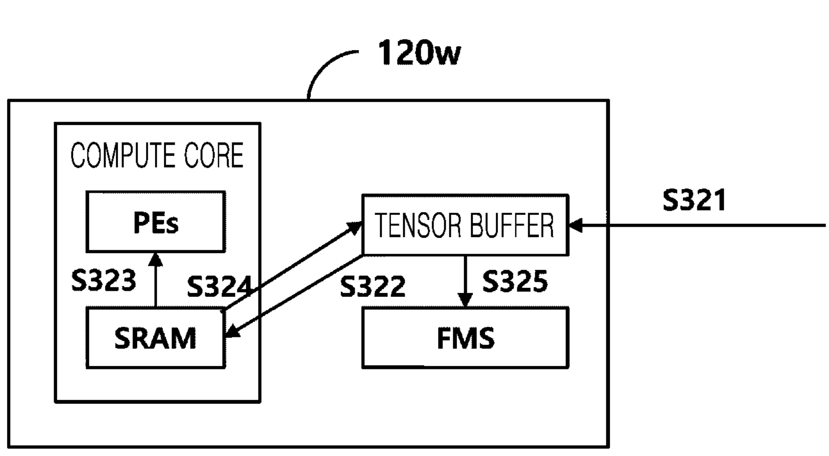

FIGS. 3A to 3C illustrate a data flow according to a DNN training process according to an embodiment. The DNN training process may include a forward propagation step of FIG. 3A, a backward propagation step of FIG. 3B, and a step of updating a final weight of FIG. 3C performed after completion of the forward propagation step and the backward propagation step for all layers included in the DNN model. The forward propagation step and the back propagation step are executed for each layer, and the step of updating the final weight is executed only once at an end of each iteration process.

The forward propagation step of FIG. 3A includes six steps, and each step may be connected to a pipeline and operated in parallel. While calculation is performed in the activation nodes 120*a*, a weight of the weight node 120*w* is fetched in advance.

Layer execution starts with reading weights stored in the FMS of the weight nodes 120*w* and loading the weights into the tensor buffer of the weight nodes 120*w* in step S301. In step S302, the weight node 120*w* broadcasts the weights to several activation nodes 120*a*, and the activation nodes 120*a* may load these weights into the tensor buffer of each activation node 120*a*. In step S303, the activation nodes 120*a* may load the weights received from the weight node 120*w* into the SRAM buffer in the compute core. In step S304, the activation nodes 120*a* start a training operation, and when the operation on the activation nodes 120*a* is completed, activation data may be generated. In step S305, the activation nodes 120*a* may copy activation data in the SRAM to the tensor buffer. Finally, in step S306, the activation nodes 120*a* may write the activation data in the tensor buffer to NAND flash chips of the activation nodes 120*a* for reuse in the back propagation step.

The back propagation step of FIG. 3B includes six steps, and steps S311 and S312 are performed in the same manner as those of forward propagation.

In step S313, the activation nodes 120*a* may read data required for weight calculation of a current operation layer among pieces of activation data stored in the NAND flash into the tensor buffer. In step S314, the activation nodes 120*a* may store the corresponding data in the SRAM when reading of the activation data is completed. In step S315, the activation nodes 120*a* may start a training operation and generate gradient data when the operation is completed. Finally, in step S316, the activation nodes 120*a* may store gradient data in the tensor buffer.

In FIG. 3C, when operations of all layers included in the DNN are completed, the step of updating the final weight in the weight node 120*w* is performed. In step S321, after calculation of all layers is completed, a final weight gradient tensor may be transmitted from the activation nodes 120*a* to the tensor buffer 122 of the weight node 120*w*. After confirming that all the weight gradient tensors have been received, the weight node 120*w* may load weight gradients into the SRAM of the compute core in step S322. In step S323, the weight node 120*w* may update a training result in weight data. In operation S324, the weight node 120*w* may store the updated weight data in the SRAM. In step S325, the weight node 120*w* may record the updated weight data in the NAND flash memory.

Figures 4, 5:
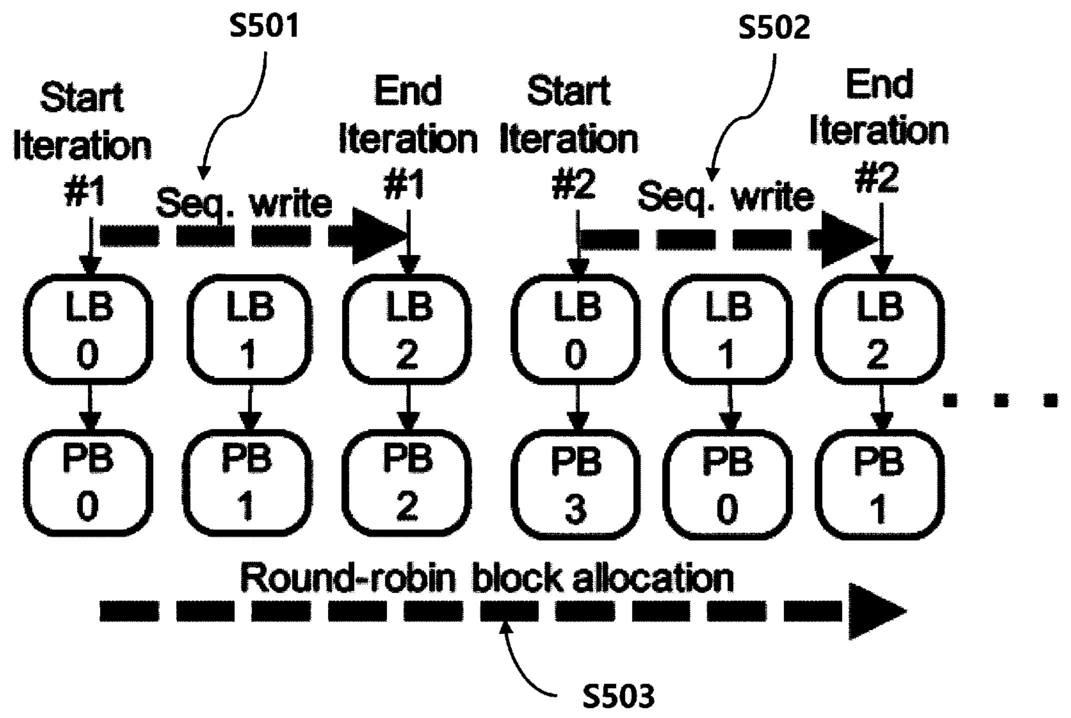
FIG. 4 is a table illustrating a storage area on an FMS for a DNN training data type according to an embodiment.
FIG. 5 is a diagram illustrating sequential data incremental writing according to a round-robin block allocation policy of the DNN accelerator system according to an embodiment.

FIG. 4 is a table illustrating a storage area on an FMS for a DNN training data type according to an embodiment. The DNN accelerator system 100 according to an embodiment may store data in a separate storage area on the FMS according to each data characteristic.

Latest NAND flash memory-based storage employs a lot of flash channels and a method of increasing a bandwidth and capacity. Since a bandwidth with a host (main processor) for the storage needs to meet a performance requirement of a user, there is the issue of ensuring performance in competition with a requirement for an internal bandwidth of the storage. In terms of a hardware bandwidth of the NAND flash-based storage, an interface speed, the number of NAND channels, and the number of NAND chips connected to the channels may define a maximum achievable speed of the NAND flash-based storage. Technically, a bandwidth of a flash-based memory system may be improved by utilizing a large number of NAND channels as well as a sufficient number of NAND chips per channel to saturate a channel bandwidth. It is possible to build a high-bandwidth NAND system by increasing the number of channels or the channel bandwidth. However, to take full advantage of a high peak bandwidth of such a NAND device, it is necessary to perform sequential writing as much as possible, and avoid bottlenecks by slow NAND firmware running on a general-purpose processor.

Even though it is generally difficult to identify a data access pattern of a workload before the workload is executed, the DNN accelerator system 100 may utilize a data access pattern that can be statically analyzed. The DNN accelerator system 100 accesses three types of data, each of which has a significantly specific characteristic as listed in FIG. 4.

First, there are two types of data in the FMS of the activation nodes 120a, which are training input data and activation data. Here, the training input data is a set of text data used as a training input of a DNN model. This data is written by the processor 110 before training starts, and is then discarded when training is finished. The activation data is recorded by a compute core of an FMS platform during a forward path of training and then consumed during a reverse path of training. The activation data is not written to or read from the processor 110 and a lifespan cycle of such data is significantly short (in seconds or up to several minutes) since the data only lives within a single iteration.

Similar to the activation nodes 120a, there are two types of data in the FMS of the weight node 120w.

First, an updated final model weight is held at the end of training (or after a certain iteration for checkpoint of an intermediate weight) and read later by the processor 110.

Second, an intermediate model weight updated at an end of each iteration process is stored. Two data types stored in the same device (that is, the training input data versus the activation data of the activation nodes 120a, and the final training weight versus the intermediate model weight of the weight node 120w) have completely different characteristics, and thus the two data types may be logically separated and stored in a space such as a multi-stream SSD.

In addition, it is possible to use two streams of a non-volatile stream (NV-Stream) and a volatile stream (V-Stream). Since streams are physically separated by block address boundaries, each stream may function as a separate storage space, and thus each single stream may have a unique logical address space, and a P/E cycle allowed based on an access right and a retention requirement.

For example, activation data generated in the DNN training process of the activation nodes 120a is recorded in a storage space named V-stream, this space does not correct persistence of the stored data (that is, data disappears when power is turned off), data written once may be normally read only within a few minutes, and the accelerator nodes 120 may access the data only in a sequential write/read manner for this area. On the other hand, the NV-stream, in which a training result of the weight node 120w is stored, stably records data, which has been recorded once, for several years, the processor 110 may read the information, and the accelerator nodes 120 may write or read the information. Since data distribution arrangement according to such data characteristics simplifies a memory access workload during DNN training, all memory accesses required for DNN training may be supported only by sequential read/write operations.

In various embodiments, the accelerator nodes 120 may position data in an independent storage area on the FMS that provides different functions according to data characteristics, and three types of storage areas may be defined as follows.

A first storage area (1: NV-Stream) is non-volatile, has relatively long data retention, and only allows data to be read therefrom or data to be sequentially written thereto according to a function of the accelerator nodes. A second storage area (2: V-Stream) is volatile, has relatively short data retention, and allows data to be accessed only in a sequential write/read manner A third storage area (3: NV-Stream) is non-volatile, has relatively long data retention, and only allows data to be written thereto or allows data to be accessed in a sequential write/read manner according to a function of the accelerator nodes.

FIG. 5 is a diagram illustrating sequential data incremental writing according to a round-robin block allocation policy of the DNN accelerator system 100 according to an embodiment.

In the DNN accelerator system 100, all write operations during a DNN training iteration period are performed using only an incremental sequential writing scheme, and NAND blocks are programmed to be sequentially allocated. In embodiments, a strict sequential write scheme ensures sequential access to all NAND blocks and pages, and thus eliminates complex FTL functions such as GC and explicit wear-leveling. For example, when a storage space including four physical NAND blocks (PB) is abstracted into three logical blocks (LB) and provided as user space, if the user performs only sequential write operations during all DNN training iteration intervals, the four PBs and NAND flash pages included therein are used sequentially and evenly at all times.

In general, in a NAND flash memory-based system, the FTL performs functions of GC and wear-leveling. However, in the DNN accelerator system 100, as described above, since writing of each piece of data of the FMS is sequentially ensured, complicated GC and wear-leveling functions are mostly unnecessary. Therefore, the DNN accelerator system 100 may remove the GC function of the FTL and then replace a wear-leveling block allocator with a simple round-robin block allocator.

A detailed description will be given with reference to FIG. 5. When the accelerator nodes 120 each include four PBs in the FMS, and the processor 110 sequentially uses three LBs during single DNN training iteration, data writing in the following iterative steps may be performed.

During first training iteration (Iteration #1), the FMS maps data writes to logical blocks LB 0, LB 1, and LB 2 according to sequential writes (S501), and uses physical blocks PB 0, PB 1, and PB 2.

Then, in second training iteration (Iteration #2), the FMS maps data writes to logical blocks LB 0, LB 1, and LB 2 according to an incremental sequential writing (S502) scheme, and allocates physical blocks from PB 3 to PB 0 and PB 1 according to a round-robin policy (S403). This round-robin block allocation policy may significantly lower a wear-leveling level of all NAND blocks. The DNN accelerator system 100 may greatly simplify the FTL by using this simple wear-leveling scheme and eliminating GC.

FIG. 6 illustrates hardware pipeline steps for a write path of the FMS and timing of each pipeline step according to an embodiment. A round-robin NAND block allocation policy according to embodiments remarkably reduces complexity of a storage data path, so that a data path of the FMS including a NAND flash memory and a controller controlling the same can be implemented by hardware rather than storage firmware. The storage data path implemented in hardware according to an embodiment shows that a data path of the entire storage including the FTL implemented in the existing storage firmware is accelerated through hardware logic. This storage data path implemented in hardware removes a performance bottleneck of storage to allow parallelism of the NAND flash memory to be fully utilized and to allow a bandwidth of tens of gigabytes per second or more to be achieved from a single storage medium. The NAND flash-based storage of FIG. 6 may satisfy memory performance required by a DNN training process, which will be described in detail.

Most SSD controllers employ a read automation function to accelerate read operations by utilizing special hardware that replaces (a part of) a read path of SSD firmware. On the other hand, a write data path merely relies on high-overhead firmware or is partially replaced by hardware logic with significant functional limitations. A reason therefor is that the write data path is generally much more complex than the read path. For example, the write path needs to perform a lot of extra work compared to the read path. In particular, i) NAND blocks need to be reserved for a GC operation, and ii) wear-leveling needs to be performed so that all the NAND blocks are evenly used. iii) It is necessary to ensure data consistency between internal R/W operations generated by GC, wear-leveling, and a user write command iv) Metadata necessary for recovery needs to be managed from expected or unexpected power resets. v) An exception for P/E failure needs to be handled. According to a common write data path of the FMS according to embodiments, it is unnecessary to perform an additional operation in the write path rather than the read path. Specifically, the DNN accelerator system 100 does not require GC and uses a significantly simple wear-leveling block allocator. Metadata management at the accelerator nodes 120 is not on a critical path and is unnecessary for temporary data such as activation data and intermediate weight data. Finally, exception handling is a rare case and may be ignored. Therefore, the accelerator node of the DNN accelerator system 100 according to various embodiments may automate the write data path by utilizing special hardware, thereby preventing the firmware from causing a bottleneck.

FIG. 6 illustrates hardware pipeline steps for the write path of the FMS and timing of each pipeline step. An automated write path includes (a) a write command pipeline that transfers data from the tensor buffer to the SRAM buffer of the FMS controller, and (b) a NAND program pipeline that programs data of the SRAM into the NAND. Each pipeline step may be designed to meet a memory bandwidth requirement for a DNN training operation.

In particular, steps of buffer search/invalidation and NAND page allocation of the NAND program pipeline, which have been processed in firmware of an existing SSD product, are completely replaced with FMS controller logic according to an embodiment. A hardware pipeline does not update metadata required for persistence. Temporary data that makes up the majority of the FMS may be designed not to provide persistence support since iteration may be performed again at the last checkpoint. However, data, storage of which needs to persist, may be designed, so that the user can make an explicit request (such as a write-and-flush command) for starting firmware to ensure persistence.

Durability of NAND flash-based storage depends on the program and erase (P/E) cycles of the NAND blocks since P/E operations wear out NAND blocks, thereby accelerating electron leakage in NAND cells. In addition, this damage caused by P/E cycles is cumulative, irreversible, and may generate numerous read error bits that cannot be corrected by an ECC engine of a storage controller. The FMS according to embodiments basically uses flash as a temporary buffer for activation and intermediate weights. At first glance, it may seem that frequently reprogrammed values have a significant impact on a lifespan of an SSD (defined as the number of P/E cycles that can be sustained by a NAND cell), which is substantially not true. Typically, each P/E cycle damages a NAND cell, and this damage continues to reduce a hold time of the cell. A cell is considered to have failed when a retention time falls below an ensured retention time (for example, one year for consumer-grade SSDs). At that point, the cell may not be suitable for long-term data storage. However, it may be sufficient to store data that only lasts a few minutes. In light of device physics, a programmed NAND flash cell gradually loses electrons from a floating gate over time, and the cell loses charges more rapidly when the cell is damaged by repeated P/E cycles. However, due to a low retention requirement, a battery may retain a sufficient level of charges until the retention time is over. Several studies have already demonstrated that SSD durability (number of P/E cycles) is greater when a retention requirement is relaxed. With the benefit of reduced conservation, no additional hardware resources (for example, more complex ECC engines or additional over-provisioned space) are required in the accelerator nodes 120 according to embodiments. Considering that the FMS (V-Stream Data) according to the embodiments only requires a retention time of a few minutes (for example, 5 minutes), which is almost 5000 times less than that of a typical consumer-grade SSD, the cell may maintain a fairly large capacity, which corresponds to the number of P/E cycles before a minimum retention time of the cell falls below a few minutes.

FIG. 7 is a flowchart of a method of training a DNN model according to an embodiment.

In step S710, the DNN accelerator system 100 may perform a forward propagation step in which one or more activation nodes and a weight node perform operations in each layer. The forward propagation step is the same as that of FIG. 3A described above.

In step S720, the DNN accelerator system 100 may perform a back propagation step of generating gradient data according to an operation result in response to the forward propagation step in each layer. The back propagation step is the same as that of FIG. 3B described above.

In step S730, steps S710 to S720 are repeated until operations for all layers of the DNN are completed.

In step S740, the DNN accelerator system 100 may update a final weight based on final gradient data. A step of updating the final weight is the same as that of FIG. 3C described above.

The embodiments described above may be implemented by a hardware component, a software component, and/or a combination of the hardware component and the software component. For example, the devices, methods, and components described in the embodiments may be implemented using one or more general purpose or special purpose computers such as a processor, a controller, an arithmetic logic unit (ALU), a digital signal processor, a microcomputer, a field programmable gate array (FPGA), a programmable logic unit (PLU), a microprocessor, or any other devices capable of executing and responding to instructions. The processing device may execute an operating system (OS) and one or more software applications running on the OS. In addition, the processing device may access, store, manipulate, process, and generate data in response to execution of software. For convenience of understanding, even though it is described that one processing device is used in some cases, one of ordinary skill in the art may recognize that the processing device may include a plurality of processing elements and/or a plurality of types of processing elements. For example, the processing device may include a plurality of processors or one processor and one controller. In addition, it is possible to adopt another processing configuration such as a parallel processor.

Software may include a computer program, code, an instruction, or a combination of one or more thereof, and may configure the processing device to operate as desired or independently or collectively instruct the processing device.

The software and/or data may be interpreted by the processing device, or may be permanently or temporarily embodied in a certain type of machine, component, physical device, virtual equipment, computer storage medium or device, or transmitted signal wave in order to provide an instruction or data to the processing device. The software may be distributed over a networked computer system and stored or executed in a distributed manner. The software and data may be stored in one or more computer-readable recording media.

The methods according to the embodiments may be implemented in the form of program instructions that can be executed by various computer means and recorded in a computer-readable medium. The computer-readable medium may include program instructions, data files, data structures, etc., alone or in combination. The program instructions recorded on the medium may be specially designed and configured for the embodiments, or may be known and available to those skilled in the art of computer software. Examples of the computer-readable medium include hardware devices specially configured to store and carry out program instructions, such as magnetic media such as a hard disk, a floppy disk, and a magnetic tape, optical media such as a CD-ROM and a DVD, magneto-optical media such as a floptical disk, a ROM, a RAM, a flash memory, etc. Examples of program instructions include not only machine language code such as is generated by a compiler, but also high-level language code that can be executed by a computer using an interpreter, etc. The hardware devices described above may be configured to operate as at least one software module to perform the operations of the embodiments, and vice versa.

According to embodiments, an accelerator system for training a DNN model based on a NAND flash memory may significantly improve a lifespan of a NAND flash by reflecting characteristics of DNN training data and characteristics of the NAND flash.

According to embodiments, by classifying data according to characteristics of data required for a DNN and improving a NAND flash controller based thereon, storage performance may be doubled or more compared to an existing SSD.

According to embodiments, the memory price may be reduced three times or more compared to an existing DNN training system (TPU V3) using an existing DRAM-based HBM as a main memory system.

According to embodiments, training throughput may be improved by two times or more compared to an accelerator connected to a commercial SSD.

As described above, even though the embodiments have been described with reference to the limited embodiments and drawings, various modifications and variations are possible by those skilled in the art from the above description. For example, even when the described techniques are performed in a different order from that of the described method, and/or the described components of the system, structure, device, circuit, etc. are coupled or combined in a different form from that of the described method or replaced or substituted by other components or equivalents, it is possible to achieve an appropriate result. Therefore, other implementations, other embodiments, and equivalents to the claims are within the scope of the following claims.

What is claimed is:

1. A deep neural network (DNN) accelerator system comprising:

a plurality of accelerator nodes each including a plurality of NAND flash memories, a flash memory system (FMS) controller for controlling the plurality of NAND flash memories, and a tensor buffer; and a processor configured to generate an operation sequence of the plurality of accelerator nodes, wherein a DNN model is trained in a data parallel manner using the plurality of accelerator nodes, wherein the plurality of accelerator nodes are configured to participate in a multi-phase training process including generation of intermediate training data and updating of model parameters across multiple layers of the DNN model, wherein, during training of the DNN model:

intermediate training data generated by execution of one or more layers of the DNN model is stored in the plurality of NAND flash memories and retained for reuse during subsequent training operations;

different classes of training data generated during training are stored and managed differently within the plurality of NAND flash memories based on a role of the training data in the training process; and the FMS controller manages allocation and access to the plurality of NAND flash memories based on a training phase associated with the stored training data.

2. The DNN accelerator system according to claim 1, wherein the plurality of accelerator nodes includes one or more activation nodes for performing a series of operations for DNN training and includes a weight node for managing weights.

3. The DNN accelerator system according to claim 2, wherein:

the multi-phase training process includes a forward propagation step, a back propagation step, and a step of updating a final weight by the one or more activation nodes and the weight node; and the forward propagation step and the back propagation step are performed for each layer included in the DNN model, and the step of updating the final weight is performed after operations for all layers included in the DNN model are completed.

4. The DNN accelerator system according to claim 3, wherein:

in the forward propagation step, when calculation of each layer is completed in each of the one or more activation nodes such that intermediate training data comprising activation data is generated in an SRAM, the activation data is copied to a tensor buffer of each of the activation nodes, and the activation data stored in the tensor buffer is stored in the plurality of NAND flash memories of each of the activation nodes for reuse in the back propagation step;

in the back propagation step, data necessary for weight calculation of a current operation layer among pieces of the activation data stored in the plurality of NAND flash memories is read into the tensor buffer at each of the activation nodes, the activation data is loaded into the SRAM to start calculation in response to completion of reading of the activation data, and intermediate training data comprising gradient data is stored in the tensor buffer of each of the activation nodes in response to completion of calculation; and in the step of updating the final weight, final weight gradient data calculated in each of the one or more activation nodes is transmitted to the tensor buffer of the weight node, the weight data is updated with a training result, and the updated weight data is stored in the plurality of NAND flash memories of the weight node.

5. The DNN accelerator system according to claim 1, wherein the FMS controller allocates blocks of the plurality of NAND flash memories based on a round-robin policy for incremental sequential writing during training of the DNN model.

6. The DNN accelerator system according to claim 1, wherein the accelerator nodes position data in one or more independent storage areas on an FMS providing different storage functions according to data characteristics associated with different classes of training data.

7. The DNN accelerator system according to claim 6, wherein the storage areas on the FMS providing different storage functions include:

a first storage area which is non-volatile, is configured to retain data across multiple training operations, and exclusively allows data to be read therefrom or data to be sequentially written thereto according to a function of the accelerator nodes;

a second storage area which is volatile, is configured to retain data during execution of one or more training operations, and allows data to be accessed exclusively in a sequential write/read manner; and a third storage area which is non-volatile, is configured to retain data after completion of training, and exclusively allows data to be written thereto or allows data to be accessed in a sequential write/read manner according to a function of the accelerator nodes.

8. The DNN accelerator system according to claim 1, wherein the tensor buffer serves as a staging area between a compute core for performing a DNN training operation and the plurality of NAND flash memories during execution of the training process.

9. The DNN accelerator system according to claim 8, wherein the tensor buffer includes a double data rate (DDR) DRAM.

10. The DNN accelerator system according to claim 1, wherein a data path of the FMS is implemented to correspond to a physical hardware configuration of the plurality of the NAND flash memories.

11. A method of training a DNN model, the method comprising:

a forward propagation step in which, while iterative training is performed for one or more layers of the DNN model, one or more activation nodes and a weight node perform an operation in each of the one or more layers, wherein intermediate training data generated during the forward propagation step is stored in non-volatile memory and retained for reuse during subsequent training operations;

a back propagation step in which the one or more activation nodes and the weight node generate gradient data according to the operation in response to each forward propagation step, wherein gradient data generated during the back propagation step is stored separately from the intermediate training data in the non-volatile memory; and a step of updating, by the weight node, a final weight based on final gradient data in response to completion of operations of all the layers, wherein storage and access to the non-volatile memory are managed based on a training phase associated with the stored training data.

12. The method according to claim 11, wherein:

each of the one or more activation nodes and the weight node comprises a plurality of NAND flash memories, an FMS controller for controlling the plurality of NAND flash memories, and a tensor buffer; and execution of a step of training the DNN model is started according to an operation sequence for training the DNN model that controls execution of the forward propagation step, the back propagation step, and the step of updating the final weight.

13. The method according to claim 12, wherein the forward propagation step includes:

a step of generating activation data in an SRAM by completing calculation in each of the one or more activation nodes;

a step of copying the activation data in the SRAM to the tensor buffer of each of the activation nodes; and a step of storing the activation data stored in the tensor buffer in the plurality of NAND flash memories of each of the activation nodes as intermediate training data for reuse in the back propagation step.

14. The method according to claim 13, wherein the back propagation step includes:

a step of reading data necessary for weight calculation of a current operation layer among pieces of the activation data stored as intermediate training data in the plurality of NAND flash memories into the tensor buffer at each of the activation nodes;

a step of loading the activation data into the SRAM to start calculation; and a step of storing intermediate training data comprising gradient data generated in response to completion of the calculation in the tensor buffer of each of the activation nodes.

15. The method according to claim 14, wherein the step of updating the final weight includes:

a step of transmitting intermediate training data comprising final weight gradient data calculated in each of the one or more activation nodes to the tensor buffer of the weight node;

updating the weight data based on a training result at the weight node; and a step of storing the updated weight data in the plurality of NAND flash memories of the weight node as training data distinct from the intermediate training data used during the forward propagation step and the back propagation step.

16. The method according to claim 12, wherein each FMS controller allocates blocks of the plurality of NAND flash memories based on a round-robin policy for incremental sequential writing during execution of the forward propagation step, the back propagation step, and the step of updating the final weight.

17. The method according to claim 12, wherein the one or more activation nodes and the weight node position data in one or more independent storage areas on an FMS providing different storage functions according to data characteristics associated with different classes of training data.

18. The method according to claim 17, wherein the storage area on the FMS providing different functions includes:

a first storage area which is non-volatile, is configured to retain data across multiple training operations, and exclusively allows data to be read therefrom or data to be sequentially written thereto according to a function of the activation nodes or the weight node;

a second storage area which is volatile, is configured to retain data during execution of one or more training operations, and allows data to be accessed exclusively in a sequential write/read manner; and a third storage area which is non-volatile, is configured to retain data after completion of training, and exclusively allows data to be written thereto or allows data to be accessed in a sequential write/read manner according to a function of the activation nodes or the weight node.

19. The method according to claim 12, wherein the tensor buffer includes a double data rate (DDR) DRAM.

20. A computer-readable non-transitory recording medium storing a computer program including at least one instruction configured to execute, by a processor, the method of training the DNN model according to any one of claims 11 to 19.

* * * * *